US005683747A

United States Patent [19]

Hamon

[11] Patent Number: 5,683,747

[45] Date of Patent: Nov. 4, 1997

[54] CARBON FIBER REINFORCED COATINGS

[75] Inventor: Ray C. Hamon, Toledo, Ohio

[73] Assignee: Ashland Oil, Inc., Ashland, Ky.

[21] Appl. No.: 957,317

[22] Filed: Oct. 6, 1992

Related U.S. Application Data

[62] Division of Ser. No. 653,558, Feb. 11, 1991, Pat. No. 5,284,701.

[51] Int. Cl.[6] .............................. B32B 5/00; B32B 7/00; B32B 27/00; B32B 31/00

[52] U.S. Cl. .............................. 427/203; 427/180; 427/189; 427/195; 427/196; 427/206; 427/402; 427/407.1; 427/412.1; 427/412.2; 427/412.3; 427/412.4; 427/412.5; 428/408; 442/110; 442/133; 442/179

[58] Field of Search .............................. 428/224, 286, 428/287, 408; 427/407.1, 180, 189, 195, 196, 203, 206, 402, 412.1, 412.2, 412.3, 412.5

[56] References Cited

U.S. PATENT DOCUMENTS

| | | | |
|---|---|---|---|
| 3,783,101 | 1/1974 | Porath et al. | 428/407 |
| 4,752,405 | 6/1988 | Kyle et al. | 252/41 |
| 4,778,524 | 10/1988 | Chapin | 106/10 |
| 4,828,842 | 5/1989 | Furst et al. | 424/180 |

*Primary Examiner*—Patrick J. Ryan
*Assistant Examiner*—Richard C. Weisberger
*Attorney, Agent, or Firm*—Richard C. Willson, Jr.

[57] ABSTRACT

Carbon fiber mat are embedded in a coating by first rolling on a coating of e.g. epoxy on the floor or wall, then applying sheets of fine carbon fibers, (optionally) removing the carbon fiber which is not adherent after the coating has dried, then applying one or more additional top coats of coating to additionally embed the carbon fibers. The result is an electrically conductive floor and/or wall coating system useful in antistatic rooms such as clean rooms, operating rooms, etc. Coatings can be sol vent based or waterborne urethanes, epoxies, alkyds, polyethylenes, acrylics, vinyls, vinyl acetates, esters, polyesters, sulfones, polysulfones, silicones, polysilicones and others. The preferred mats are carbon fiber "veils" or "paper" generally having a density of about 0.75 oz./square yard.

6 Claims, 1 Drawing Sheet

FIG. 1
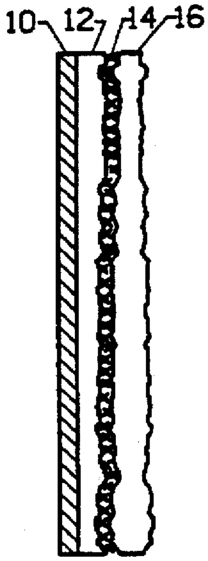
FIG. 2
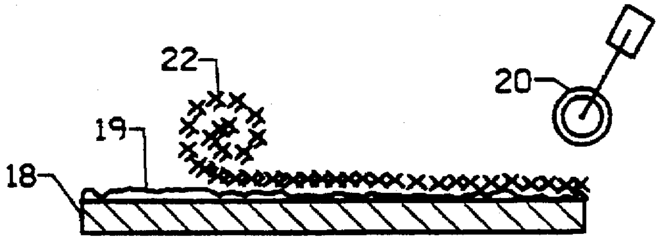
FIG. 3
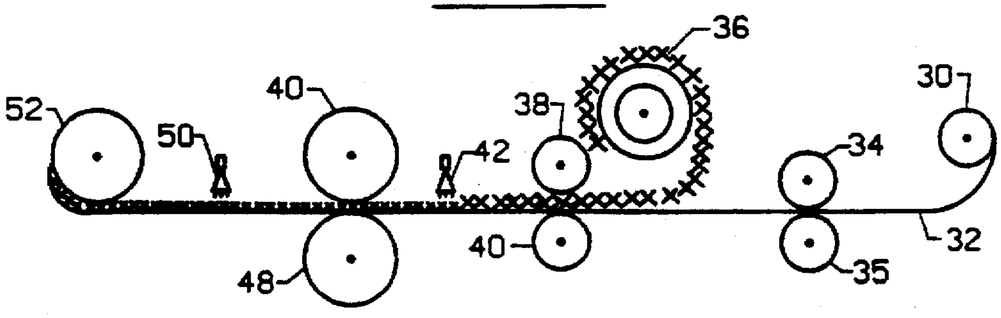
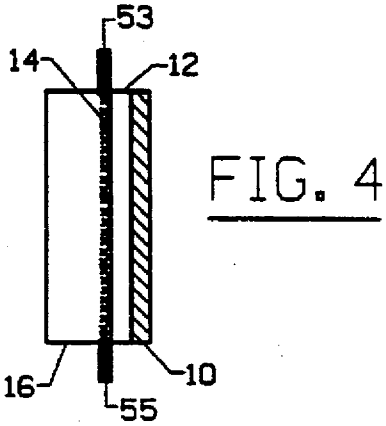
FIG. 4

CARBON FIBER REINFORCED COATINGS

This application is a division of U.S. Ser. No. 653,558, filed Feb. 11, 1991, now U.S. Pat. No. 5,284,701.

BACKGROUND OF INVENTION

I. Field of the Invention

The present invention is related to coatings, particularly conductive coatings generally classified in U.S. Patent and Trademark Office Class 361/216, 361/216, 361/220, and 361/221; Class 106/284.05; Class 156/71 and 156/289; and Class 428/408 and 428/922; and possibly Class 361/216.

II. Description of the Prior Art "Microwave Transmission and Reflection of Carbon Fiber Mat" by J. F. Lindsey III, Southern Illinois University, describes microwave reflection and transmission of Ashland Carboflex® mat, a general purpose carbon fiber mat produced by Ashland Carbon Fibers, division of Ashland Oil, Inc., Ashland, Ky., and indicate very low power transmission characteristic with attenuation in excess of 65 dB and provides "excellent microwave shielding".

U.S. Pat. No. 4,308,568 to Whewell teaches antistatic conductive construction material useful for covering floors and walls comprising ground graphite and colloidal carbon particles. (It is understood that this technique makes only gray and dark colors and provides conductivity which is non-uniform.)

U.S. Pat. No. 3,121,825 to Abegg discloses conductive flooring containing a netting, preferably soldered, or continuous metal sheet with a thermosetting plastic applied over the conductive layer. This technique requires ground metal to be included in the formulation.

U.S. Pat. No. 2,323,461 to Donelson, U.S. Pat. No. 2,413,610 to Donelson, and U.S. Pat. No. 2,457,299 to Biemesderfer also relate to electrically conductive floors.

Other patents showing laminates, mats, and sheets used in antistatic applications are: U.S. Pat. No. 4,724,187 to Ungar, U.S. Pat. No. 4,438,174 to Whewell, U.S. Pat. No. 4,472,474 to Grosheim, U.S. Pat. No. 4,728,395 to Boyd, U.S. Pat. No. 4,219,608 to Conklin, U.S. Pat. No. 4,347,104 to Dressier, U.S. Pat. No. 4,540,624 to Cannady, U.S. Pat. No. 4,557,968 to Thronton, and U.S. Pat. No. 4,567,094 to Levin.

None of the above patents combines the ease of formation with the resulting uniform highly conductive coating, capable of being made in even light colors, of the present invention.

SUMMARY OF THE INVENTION

I. General Statement of the Invention

According to the present invention, carbon fiber mats (woven or non-woven) are embedded in a coating by first rolling on a coating of, for example, epoxy on the floor or wall or other substrate, then applying woven or nonwoven sheets of fine carbon fibers, (optionally) removing any carbon fiber which is not adherent after the coating has dried, then applying one or more additional top coats of coatings to additionally embed the carbon fiber. The result is electrically conductive floor, wall or other substrate coating system which is useful in antistatic rooms such as clean rooms, operating rooms, computer rooms, etc. The invention will additionally shield against microwave radiation, electromagnetic interference and radio frequency interference.

Coatings can be solvent or waterborne urethanes, epoxies, alkyds, polyethylenes, acrylics, vinyls, vinyl acetates, esters, polyesters, sulfones, polysulfones, silicones, polysilicones, polyacrylates, vinyl acrylics, styrene acrylics, laticies, and others. The preferred mats are carbon fiber "veils" and "paper" generally having a density of about 0.75 ounces per square yard.

II. Utility of the Invention

The present invention is useful in almost any application where electrical shielding, microwave shielding, EMI or RFI shielding, or other use of conductive layer is required. The invention is distinguished not only by its ease of preparation, but also by its uniformly high electrical conductivity.

The invention is also valuable in the preparation of burglary-detection barriers where penetration may be observed by electrical characteristics of a wall, ceiling or floor to which the invention has been applied, as in U.S. Pat. No. 4,523,528. The invention may also be used for heating purposes so that an electrical current generates heat uniformly over a panel coated with the invention, as in, for example, U.S. Pat. No. 4,301,356 to Teanei, or may be applied to flexible substrates to form electrical heating strips as in U.S. Pat. No. 4,534,886 to Kraus.

BRIEF DESCRIPTION OF THE DRAWINGS

FIG. 1 is a schematic diagram of a substrate coated with the three-layer coating of the present invention.

FIG. 2 is a schematic of the process of applying the three coatings of the present invention.

FIG. 3 is a schematic of a flexible substrate being coated with the three layers of the present invention.

FIG. 4 shows the burglary detection embodiment of Example IV.

DESCRIPTION OF THE PREFERRED EMBODIMENTS

Starting Materials:

The starting materials for the present invention will not be narrowly critical but will generally include:

(a) Substrate; The substrates can be walls, floors, ceilings of all sorts of conventional construction materials, including hardboard, wallboard, plywood, plastic panels, machine housings, and even flexible materials as shown in FIG. 3.

(b) Coating materials; typical coatings include solvent or waterborne urethanes, epoxies, alkyds, polyethylenes, acrylics, vinyls, vinyl acetates, esters, polyesters, sulfones, polysulfones, silicones, and polysilicones, among others. As the coating material itself is not involved in the conductivity property of the finished layered coating, the coating material need not be narrowly critical. The base coating and the top coating can be the same or all different. The top coating may be covered itself by additional coatings to provide pigmentation, or to provide leveling to compensate for the thickness of the carbon fibers.

(c) Carbon fiber;

(d) Second coating material: can be the same or different as the coating material used to form the first layer; can be pigmented, or colored as desired, or can be clear, generally have a thickness in the range of about 1 to about 50 mils.

(e) Finished coating material;

(f) Other ingredients: pigments, additional conductive agents, electrodes, etc.

(g) Method of application: rolling, spraying, brushing, and most other conventional methods of applications of coatings can be employed. Rolling is particularly preferred, but spraying also is preferred.

EXAMPLE 1

(The Invention Practiced on a Vertical Wall)

Referring to FIG. 1, a vertical wall 10 composed of common wall board is coated with a first coating 12 by means of a pressurized-paint-pot-feed roller, then allowed to dry until tacky to the touch. A thin veil of carbon fibers having fibers in many directions so as to have some dimensional stability, and having a density of about ⅜ of an ounce per square yard is gently applied to the tacky vertical paint film in much the same manner as hanging wall paper. Strips of the veil are slightly overlapped as they are applied so a continuous conductive layer of carbon fibers is formed adhering to the tacky vertical coating. The carbon fibers are then rolled vigorously with a clean dry paint roller to ensure their adherence and to press them down into the tacky paint film. After the coating is well-dried according to its normal curing time, a second coating layer is applied over the carbon fiber veil. The build of the second layer is approximately 10 to 20 mils and the carbon fiber layer is completely covered by the second layer. After the coating has completely dried, a finish coating of white-pigmented epoxy is applied and allowed to dry. The completed four-layer coating is white in appearance, firm, easily washable, and exhibits excellent shielding characteristics to both radio waves (RFI), microwave, and electromagnetic waves (EMI) with the attenuation being 50 decibels or below.

EXAMPLE II (The Invention Embodying Electrodes)

When a vertical substrate 10, as in Example I, is coated with a coating material 12 which is allowed to become tacky and a carbon fiber veil is applied as in Example I, electrodes 53 and 55 are run along the top and bottom of the tacky film before the finish coat is applied. These electrodes are strip copper and make good electrical contact with the carbon fibers embedded in the coating layers.

EXAMPLE III (Invention, Electrodes Used for Heating)

When the electrodes of Example II are connected to a source of 6 volts to 240 volts current, a warming of the entire panel formed by the substrate and the coating layers is observed due to the resistance of the carbon fiber.

EXAMPLE IV (Invention, Electrodes Used for Burglary Detection)

When the electrodes 53 and 55 of FIG. 9 are connected to a suitable electrical detector any penetration of the coating causes a change in electrical resistivity, capacitance, or other electrical characteristic being measured. Connecting the measuring device to a high-low alarm provides a signal detecting penetration as in a burglary. When this coating system is applied to the floors, ceiling, and walls of a room, and the door is provided with a suitable magnetic switch or other alarm, a burglary-proof room is provided.

EXAMPLE V

Substrate: White poster board.
Paint: Fast dry green enamel alkyd from Toledo Paint and Chemical Company, Toledo, Ohio.
Carbon Fiber Matting: Carboflex® ¾ ounce/square yard paper from Ashland Carbon Fibers, Ashland, Ky.

Procedure:

Using a paint brush, a coat of the green alkyd paint is applied to the poster board, and a sheet of the Carboflex® paper is laid over the wet paint on the board and the coating permitted to dry overnight (about 17 hours). Another coat of the green paint is then applied over the Carboflex® paper and permitted to dry. Using the Biddle test instrument Mark IV Conductive Test Kit, manufactured by James G. Biddle Co., Plymouth Meeting, Pa. 14462, the resistance of this coating was less than 10,000 ohms.

Coating:

Sears Weather Beater Satin Exterior Acrylic Latex House and Trim Paint, tint base 30 51904, tinted to color 293, provocream-ABC (90), series 5100.

The substrate is coated with the paint and ¾ ounce carbon matting (veil), lot #20204 from Ashland Petroleum Company, Ashland, Ky., is applied and permitted to dry 30 minutes. A second coat of the same paint is applied using a squeegie to fill in the voids and smooth the surface. After this dries, a third coat just thick enough to smooth the surface and give a good uniform color, but still showing the carbon paper matting slightly is applied.

Seven different readings are made on various samples and locations using a Charles Waters Megger and the readings are from less than $10^5$ ohms/square to $10^7$ ohms/square.

When samples are tested using a Mark II conductive test kit from James G. Biddle Company, Plymouth Meeting Pa. 19462, the readings of the samples with the epoxy overlayment substrate are all well below 10,000 ohms/square, and most were below about 5,000 ohms/square.

EXAMPLE VI (Conductive Shielding and Protection from Static Electric Conditions)

Foam flocked fabric is produced with different types of fibers, as for example, cotton, polyester, nylon, silk, and paper. This conventionally produces a cloth that is versatile and has many uses, but is not conductive and does not dissipate electrical charges.

When carbon fibers are used to make a foam flock fabric (fine carbon fiber sprayed-on from a foam flock gun) either alone or combined with other fabrics, the resulting fabric is electrically conductive and dissipates electrical charges, and can be formulated to contain enough carbon fiber for fire resistance and fire retardance.

EXAMPLE VII

FIG. 2 shows the application of layered coatings of the invention to a substrate 18 to which a conventional paint coating 19 has been applied with a roller. The carbon fiber matting 22 is shown being unrolled and then being rolled onto the tacky first paint coating with roller 20.

EXAMPLE VIII (The Invention Applied onto a Flexible Substrate)

FIG. 3 shows schematically apparatus for applying the layered coatings of the present invention to a flexible substrate 32 which is unrolled from a roll 30, passes between paint roll 34 and squeeze roll 35 where a conventional epoxy or other coating is applied, then passes between squeeze rolls 38 and 40 which press a carbon fiber veil from roll 36 into the tacky coating. Then passes under heat lamps 42 which cure the first coating and then through paint roll 46 and squeeze roll 48 where a second outer coating is applied, then through heat lamp 50 which cures the outer coating, and finally, to take-up roll 52 where the flexible substrate with the layered coating of the invention is rolled for shipment. The substrate can be sheet vinyl or other plastic, conventional woven cloth, e.g. fabric or synthetic fibers, nonwoven fabrics, etc. and the coating materials will be materials which are adhesive to the substrate and which retain flexibility when dry. In general, the coatings for use with the techniques as shown in FIG. 3 will be fast-drying, polymerizable coatings, and the heat lamps may optionally be augmented or replaced by vapor-phase polymerization catalyst applicators to speed drying.

EXAMPLE IX

The invention is also valuable for heating tanks of all sizes. Many large and small storage tanks and tanks used in production and manufacturing processes have to be insulated and heated. This carbon veil can be used to produce the necessary heat required to keep the contents of the tanks from freezing. This is a highly efficient heating method that only requires low energy demands of 24 volts or less. This makes it very cost effective when compared to the present systems.

EXAMPLE X

The invention is also useful in the production of plastic or polymer buckets, drums, containers and pipes to make them groundable, e.g. hooking to a water line with a flexible wire such as copper. Plastic pipes and containers are very dangerous to use with flammable solvents because of the static electrical charges caused by the friction of the liquids against the plastic container. If the static electricity is discharged causing a spark, making a fire and possible explosion. Being able to ground these containers and pipes makes them as safe as metal pipes and containers that have to also be grounded. As plastic pipe and containers are made at present, they cannot be grounded, but incorporating carbon fibers makes them conductive, thus self-grounding.

EXAMPLE XI

The "Carboflex" brand carbon veil available from Ashland Carbon Fibers, Ashland, Ky. 41114, is useful to produce carpeting that is groundable and prevents the production of static electricity by the friction of walking, cleaning, etc. The carbon veil is woven, tied, adhered with polymer adhesives, or made an intricate part of the backing for carpeting. When the carpeting is grounded through the floor or framing of the building, the building is much safer, especially for the critical areas such as hospitals, computer rooms, electronical parts manufacturing areas, etc.

EXAMPLE XII

A sheet of Carboflex® veil ¾ oz./$yd^2$, about 3'×3' is folded into a 12"×3' section. The two ends (12" wide) are wrapped with aluminum tape that contains electrical lead cords. The cords are hooked to a 240 volt (two 120 volt hot wires and i neutral or ground wire) electrical supply. The carbon veil becomes very hot in a few seconds. The carbon veil vibrates at an intense speed and makes an audible humming sound. This experiment is performed outdoors and a large amount of heat is radiated from the carbon veil. However, the carbon veil does not glow red. Removing the power and the carbon veil cools quickly in the 60° outside temperature. A 1 lb. coffee can is wrapped with the sheet of carbon veil and fill it about ⅔ full of water. Again, the 240 volts of power is turned on. The water started a vigorous boil in about 4 minutes and 10 seconds. Measure the amperage required using an Amp Meter and the reading is about 3.5 amps.

Modifications

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

While not narrowly critical, the carbon fibers are preferably oriented in more than one direction so as to form a handleable matrix, and have a weight in the range of about 0.1 to about 5 ounces per square yard (2.4 to 120 grams per square meter), and have an individual fiber diameter in the range of about 3 to 20 microns, and an individual fiber length in the range of about 0.1 to 3 inches. The coating is generally applied to a thickness in the range of from about 0.5 to 10 mils, and the compound 3-layer coating has an electrical conductivity preferably in the range of about 50 to 5 million ohms per square as measured at the exposed surface of the second coating layer.

Reference to documents made in the specification is intended to result in such patents or literature being expressly incorporated herein by reference including any patents or other literature references cited within such documents.

What is claimed is:

1. A process for producing an electrically conductive surface comprising in combination the steps of:

a. applying to a surface a permanent coating of an air drying or polymerization curing resin coating material to a depth in the range from about 0.5 to 10 mils;

b. while said coating material is tacky and before it has fully cured, applying to said surface a veil of carbon fiber; said veil having a weight per square yard in the range of from about 0.1 to about 5 ounces per square yard (2.4 to 120 grams per square meter), and being comprised of carbon fibers having a diameter in the range of from about 3 to 20 microns, and a fiber length in the range of from about 1/10 to 3 inches, and pressing said veil to ensure good adherence to said first layer of coating material;

c. applying a second layer of a same or different coating material having a thickness of 2 mil to 50 mil substantially compeltely covering the veil and permitting said coating material to cure; whereby said compound 3-layer coating has a electro conductivity in the range of from about 50 to 5 million ohms per square as measured at the exposed surface of said second coating layer.

2. A process according to claim 1 wherein the first coating layer is allowed to dry tack-free after the carbon fiber has been applied and before the second layer is applied.

3. A process according to claim 1 wherein both coating materials are the same.

4. A process according to claim 1 wherein the coatings have a thickness in the range of from about 1 to about 5 mils.

5. A manufacture according to claim 1 wherein the carbon fiber layer has a weight in the range of from about 0.2 to about 2 ounces per square yard.

6. A process according to claim 1 wherein the coating materials comprise a waterborne epoxy.

* * * * *